United States Patent
Plum et al.

(10) Patent No.: US 12,057,779 B2
(45) Date of Patent: Aug. 6, 2024

(54) CIRCUIT APPARATUS AND METHOD FOR CONTROLLING A SECONDARY SIDE OF A DIRECT VOLTAGE CONVERTER

(71) Applicant: Robert Bosch GmbH, Stuttgart (DE)

(72) Inventors: Thomas Plum, Cologne (DE); Jan Allgeier, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 290 days.

(21) Appl. No.: 17/619,710

(22) PCT Filed: Jun. 15, 2020

(86) PCT No.: PCT/EP2020/066431
§ 371 (c)(1),
(2) Date: Dec. 16, 2021

(87) PCT Pub. No.: WO2020/254222
PCT Pub. Date: Dec. 24, 2020

(65) Prior Publication Data
US 2022/0360186 A1    Nov. 10, 2022

(30) Foreign Application Priority Data
Jun. 19, 2019 (DE) .................. 10 2019 208 944.5

(51) Int. Cl.
*H02M 3/335* (2006.01)
*H02M 1/08* (2006.01)
*H02M 1/34* (2007.01)

(52) U.S. Cl.
CPC ......... *H02M 3/33592* (2013.01); *H02M 1/08* (2013.01); *H02M 1/348* (2021.05)

(58) Field of Classification Search
CPC ............ F41H 13/0012; F41H 13/0018; F41H 13/0025; F41A 17/063
(Continued)

(56) References Cited

U.S. PATENT DOCUMENTS 9,893,638 B1    2/2018  Strijker
10,193,457 B1 *  1/2019  Hande ..................... H02M 1/36
(Continued)

FOREIGN PATENT DOCUMENTS

DE    102012202869 A1    8/2013
EP       2717451 A2      4/2014
(Continued)

OTHER PUBLICATIONS

Translation of International Search Report for Application No. PCT/EP2020/066431 dated Jul. 20, 2020 (2 pages).

*Primary Examiner* — Yemane Mehari
(74) *Attorney, Agent, or Firm* — Michael Best & Friedrich LLP

(57) ABSTRACT

The invention relates to a circuit apparatus (10) for controlling the current flow of the secondary side (20) of a direct voltage converter, comprising: a controllable switch element (1) having a first connection (1a), a second connection (1c) and a control connection (1b); a snubber circuit, which is electrically coupled to the source connection (1a) and the second connection (1c); and a control circuit (5), which is designed to control a deactivation time of the controllable switch element (1) via the control connection (1b); wherein the control circuit (5) is electrically coupled to the snubber circuit and is designed to control the deactivation time according to an electrical parameter of the coupling.

10 Claims, 2 Drawing Sheets

(58) Field of Classification Search
USPC .......................................................... 361/232
See application file for complete search history.

(56) References Cited

U.S. PATENT DOCUMENTS

| | | |
|---|---|---|
| 2012/0063175 A1 | 3/2012 | Wang et al. |
| 2014/0126247 A1* | 5/2014 | Koch ...................... H02M 1/34 |
| | | 363/21.14 |
| 2018/0309374 A1* | 10/2018 | Koo .................. H02M 3/33561 |

FOREIGN PATENT DOCUMENTS

| | | |
|---|---|---|
| JP | H05243947 A | 9/1993 |
| KR | 20160085405 A | 7/2016 |

* cited by examiner

CIRCUIT APPARATUS AND METHOD FOR CONTROLLING A SECONDARY SIDE OF A DIRECT VOLTAGE CONVERTER

BACKGROUND OF THE INVENTION

The invention relates to a circuit apparatus for controlling the flow of current on the secondary side of a DC-DC voltage converter.

What is known as a synchronous rectifier (SGR) is often used in relatively high power DC-DC voltage converters to improve efficiency. In this case, for example, a rectifier diode at the output of such a converter is replaced by a controllable switching element, for example a MOSFET transistor. The channel of the MOSFET transistor is actively turned on, i.e. switched on so that it is electrically conductive, while a current is flowing through the intrinsic diode of the MOSFET transistor. The relatively low forward voltage of the conducting channel compared to the intrinsic diode of the MOSFET transistor reduces losses considerably, in particular in the case of DC-DC voltage converters with low output voltages and high output currents.

In order to minimize further losses, the MOSFET transistor should ideally be switched off with a control signal at the gate precisely at the time of the zero crossing of the current, in particular when the direction of flow of the current through the switching element reverses. As a result, conduction losses can firstly be minimized, and furthermore the reverse recovery losses of the intrinsic diode can be drastically reduced. Ideally, only the parasitic capacitances of the switching element are charged when it is switched off, and the energy stored in the capacitances is recovered again during the subsequent switch-on process. It is therefore possible to operate the switching element almost without switching losses.

A multiplicity of actuating circuits are known from the literature in order to control the disconnection time of a MOSFET transistor, for example, in as optimum a way as possible.

One possible approach uses measurement of the current through the switch to detect the zero crossing. This method proves to be expensive, however, and, in particular in the case of steep current edges, not very suitable for future high-frequency applications on account of delays in the measurement and signal processing.

Another approach uses precise measurement of the forward voltage of the MOSFET transistor. In the case of steep edges, however, the measured voltage is dominated by the inductive voltage drops, with the result that exact compensation for the inductance would be necessary, which hardly seems possible given different operating points of the DC-DC voltage converter. This method is additionally hampered by ever lower-resistance MOSFET transistors of less than 1 mohm, for example. An accuracy in the mV range would therefore be needed to correctly set the disconnection time, the parasitic inductive voltage drops across the components, in the case of steep current edges, being able to reach values of a few volts, however. Latencies in the signal processing and gate actuation additionally represent a further obstacle to using this method.

DE 10 2012 202 869 A1 describes a DC-DC voltage converter that has a transformer with a primary-side winding and a secondary-side winding with a center tap, a storage inductor coupled between the center tap and a first output of the DC-DC voltage converter, a rectifier circuit, a snubber circuit and an actuation apparatus. The rectifier circuit is connected to each of the end taps of the secondary-side winding and is designed to generate a rectified output voltage at a second output of the DC-DC voltage converter. The snubber circuit interconnected with the rectifier circuit is designed to store resonant oscillation energy occurring in the rectifier circuit. The actuation apparatus has a switching time ascertainment device and a control signal generator, wherein the switching time ascertainment device is designed to ascertain a period of time on the basis of the output voltage, the charge stored in the snubber circuit and the current fluctuations in the current through the storage inductor that occur on account of the rectification. The control signal generator is designed to take the ascertained period of time as a basis for generating an actuation signal to discharge the snubber circuit.

SUMMARY OF THE INVENTION

The object of the present invention is to specify a circuit apparatus that is used to adaptively control the disconnection time of a controllable switching element of a secondary side of a DC-DC voltage converter, or to ascertain an optimized disconnection time, in such a way that minimal disconnection losses arise at each operating point of the synchronous rectifier circuit. Preferably, the circuit apparatus is based on existing circuit topologies as far as possible.

According to the invention, a circuit apparatus for controlling the flow of current on a secondary side of a DC-DC voltage converter, a method for actuating a secondary side of a DC-DC voltage converter, a computer program product and a computer-readable storage medium are specified according to the features of the independent claims. Advantageous refinements are the subject matter of the dependent claims and the following description.

The invention is based on the finding that a storage element of a snubber circuit that is used for overvoltage protection for a controllable switching element in the secondary circuit of a DC-DC voltage converter has to take up a greater charge when the controllable switching element is not disconnected or switched off at the optimum time within a switching cycle. The controllable switching element is generally switched off at an interval of time relative to a switch-off process of a further switching element on the primary side of the DC-DC voltage converter. The optimum time varies according to the operating point of the DC-DC voltage converter, however, with the result that it is always desirable to adapt the switch-off time to the respective operating point of the DC-DC voltage converter. A snubber circuit is also referred to as a suppressor, damper circuit or load relieving network.

The circuit apparatus according to the invention for controlling the flow of current on a secondary side of a DC-DC voltage converter, in particular a synchronous rectifier, has a controllable switching element, for switching the flow of current through the secondary side of the DC-DC voltage converter, a snubber circuit and an automatic control circuit. The switching element has a first connection, a second connection and a control connection. The snubber circuit is electrically coupled to the first connection and the second connection. The automatic control circuit is configured to switch off the controllable switching element cyclically by means of the control connection at a predefined time, wherein the time is at a predefinable interval from a cyclical primary-side switch-off process, in particular from a switch-off process of a further switching element on the primary side of the DC-DC voltage converter. The automatic control circuit is further configured to ascertain an optimized switch-off time for a subsequent cycle or switching cycle of the controllable switching element, wherein the optimized switch-off time is brought forward or pushed back in time relative to the predefined time. The automatic control circuit is further configured to accordingly switch off the controllable switching element at the optimized switch-off time in the subsequent cycle by way of the control connection. The automatic control circuit is electrically coupled to the snubber circuit and is configured to ascertain the optimized switch-off time on the basis of an electrical variable of the snubber circuit.

In the case of an electrically isolated DC-DC voltage converter, the flow of current from the secondary-side winding to the output or the output connections of the DC-DC voltage converter is made possible by switching on a secondary-side controllable switching element in each of the phases of a transmission cycle that involve providing electrical energy on the secondary winding of the transformer. The flow of current from the secondary-side winding to the output or the output connections of the DC-DC voltage converter is interrupted and prevented by switching off the secondary-side controllable switching element in those phases of a transmission cycle in which no electrical energy is provided on the secondary winding of the transformer. This switching on and switching off corresponds to the switching of the flow of current through the secondary side of the DC-DC voltage converter. This switching occurs cyclically on account of the alternating phases of the energy transfer. There is also a switching element on the primary side of a DC-DC voltage converter, which switching element switches the flow of current or flow of energy to the primary side of the transformer cyclically. The secondary-side switching element is generally switched off on the basis of a primary-side switch-off process, the switching off of the primary-side switching element, in a manner temporally offset from a time by a predefinable interval. Depending on the operating point of the DC-DC voltage converter (current, voltage at the input, load at the output, temperature, among other things), current flows on the secondary side between the secondary-side winding and the output of the DC-DC voltage converter at this time, which current leads to losses when the controllable switching element on the secondary side is switched off. In order to reduce the losses, the switch-off time is minimally brought forward or pushed back so that at least some of the secondary-side current is reduced during the switch-off process at the optimized switch-off time. A snubber circuit protects the secondary-side switching element against overvoltages. A storage element of the snubber circuit, in particular a capacitor, is charged during switching off on the basis of the losses. It is therefore possible to determine the switch-off losses by detecting an electrical variable of the snubber circuit and to take the determined losses as a basis for determining an optimized switch-off time for a subsequent switch-off cycle.

Switching elements with parasitic capacitances, such as unipolar components for controlling the flow of current, can be used as a controllable switching element to achieve the advantage of the relatively low forward voltage. Examples of such controllable switching elements that can be cited are HEMTs (high-electron-mobility transistors), JFETs (junction-gate FETs or non-insulated-gate FETs, NIGFETs), power MOSFETs, IGBTs (insulated-gate bipolar transistors) or thyristors. Furthermore, cascodes, i.e. series circuits of normally-on components and low-voltage semiconductors, can be used to control the flow of current.

According to one refinement of the invention, it is proposed that the automatic control circuit uses a voltage tap on a storage element, in particular on a capacitor, of the snubber circuit to detect a voltage on the storage element.

The voltage on the storage element of the snubber circuit is detected as an electrical variable on the basis of which the optimized switch-off time is ascertained. During operation of the synchronous rectifier circuit, the voltage on the storage element is a measure of a commutation charge and thus of reverse recovery losses. The circuit can therefore be used to determine the extent of the losses arising. These losses can be minimized by means of further measures.

According to one measure improving the invention, it is proposed that the automatic control circuit is configured to carry out a first detection of a first voltage on the storage element of the snubber circuit after the controllable switching element is switched off for the first time, to select, for subsequently switching off said controllable switching element for the second time, a switch-off time that, compared to the first switch-off time, is brought forward or pushed back relative to the predefined interval from the primary-side switch-off process, to carry out a second detection of a second voltage on the storage element of the snubber circuit after the controllable switching element is switched off for the second time at the selected switch-off time, to ascertain a difference between the first voltage and the second voltage, and to ascertain the switch-off time optimized for the subsequent cycle on the basis of the ascertained positive or negative difference, wherein the optimized switch-off time is brought forward or pushed back relative to the last switch-off time ascertained.

A first voltage is detected after switching off for the first time. This means that, after the controllable switching element has initially been in a switched-on, i.e. on, state, and then is in an, in particular completely, off state following switch-off. During the transition time from the on state to the off state, the voltage on the storage element rises: the voltage is detected only after this transition time; the voltage is typically detected in particular at a time in the middle between switching off and switching on.

A switch-off time that is brought forward or pushed back, relative to the preceding switch-off time, is subsequently selected. Typical periods of time by which the switch-off time is varied are, for example, 2 and 100 ns. The second detection of the voltage takes place after the switching element is switched off for the second time, in a manner analogous to the first detection. If the second detected voltage is lower, at least some of the losses are minimized compared to the preceding instance of switching off. The difference between the first and the second voltage is positive. The direction of the bringing forward or pushing back is maintained so as to optimize a subsequent switch-off time. If the detected voltage were higher, then the losses would be higher. A negative difference between the voltages would result. The direction of the bringing forward or pushing back would be swapped so as to optimize a subsequent switch-off time. Accordingly, the optimized switch-off time is determined on the basis of the difference between the detected voltages. The switch-off time is brought forward or pushed back relative to the preceding switch-off time, which also depends on the time of the primary-side switch-off process and the predefinable interval from the primary-side switch-off process. An appropriate bringing forward or delaying of the switch-off time is repeated. Preferably, if the voltage rises again after the minimum has been reached, the circuit is operated with minimized losses by varying the switch-off time once in an opposing manner.

The circuit apparatus described uses existing snubber hardware, which is used for limiting the voltage across a controllable switching element, in order to set the optimum switch-off time of the controllable switching element. The necessary hardware-related changes, for determining the voltage on the snubber storage element and the applicable evaluation, are minor. Advantageously, no particular requirements have to be imposed on the detection dynamic range of the voltage determination, since the dynamic range of the system is determined by the proportionally long time constant of the snubber circuit. This circuit apparatus compensates for runtime effects such as latencies, temperature dependencies, ageing, etc.

In particular, it is proposed that the automatic control circuit is configured to repeat a change to the switch-off time that led to a reduction in the voltage on the storage element of the snubber circuit in a preceding cycle, in order to bring the voltage on the storage element of the snubber circuit to a minimum.

The automatic control circuit is configured in such a way that, in a respective cycle, there is a small variation of the disconnection time of the controllable switching element compared to the preceding disconnection time. The detection of a voltage on the storage element of the snubber circuit and in particular the calculation of the difference between the last two voltages detected are taken as a basis for determining whether the disconnection time is brought forward or pushed back in the next cycle, with the result that after a few cycles the voltage detected becomes minimal at each steady-state operating point of the DC-DC voltage converter. Optimum operation of the DC-DC voltage converter is established as a result.

In a further refinement of the invention, it is proposed that the automatic control circuit has a microcontroller circuit. It is therefore easy to implement an algorithm that is optimized for the present design of the DC-DC voltage converter and optimizes the operating point thereof.

In accordance with a further refinement of the invention, it is proposed that the first connection of the controllable switching element is connected to a positive potential connection of a secondary-side winding of a transformer of the DC-DC voltage converter, and that the snubber circuit is electrically connected to the first connection of the controllable switching element, the second connection of the controllable switching element and a negative potential connection of the secondary-side winding of the transformer.

According to a further refinement of the invention, it is proposed that the snubber circuit has a capacitor as the storage element.

According to a further refinement of the invention, it is proposed that the snubber circuit has a series circuit that comprises a diode and a capacitor as the storage element and that is connected in parallel with the first connection and the second connection of the controllable switching element, and also has a discharge resistor that is connected to a center tap, between the diode and the capacitor, and to a negative potential connection of the secondary-side winding of the transformer. In this exemplary embodiment, the snubber circuit has the three components described in the circuitry illustrated, and a capacitor is used as the storage element. It is known, however, that it is possible to realize a snubber circuit with the three components in a manner equivalent to another topology on the secondary side of the DC-DC voltage converter without the functionality or the inventive teaching of the circuit apparatus being changed.

Since such a snubber circuit is often already provided in synchronous rectifier circuits, it is only necessary to connect two input contacts of the automatic control circuit to a first and a second contact of the capacitor, and voltage measurement or detection needs to be configured for the automatic control circuit. The further necessary adaptations relate to the implementation of the algorithm described. To get closer to a minimum in this way, a series of further algorithms are known that can also optionally be selected for further optimization to rapidly get closer to a minimum for the tapped voltage from the storage capacitor.

The invention also relates to a method for actuating a secondary side of a DC-DC voltage converter, in particular a synchronous rectifier. The secondary side of the DC-DC voltage converter has a controllable switching element with a first connection, a second connection and a control connection and a snubber circuit that is electrically coupled to the first connection and the second connection.

The method switches off the controllable switching element cyclically at a time, wherein the time is at a predefinable interval from a primary-side switch-off process, and ascertains an optimized switch-off time for a subsequent switching cycle for actuating the controllable switching element on the basis of an electrical variable of the snubber circuit, in particular on the basis of a detection of a voltage on a storage element of the snubber circuit.

The method described uses snubber hardware, which is used for limiting the voltage across the MOSFET, in order to iteratively set the optimum switch-off time of the MOSFET transistor on the basis of a voltage determination at the storage element.

In one refinement of the method, the method ascertains an optimized switch-off time for actuating the controllable switching element by carrying out a first detection of a first voltage on the storage element of the snubber circuit after the controllable switching element is switched off for the first time (S1), selecting, for subsequently switching off said controllable switching element for the second time, an optimized switch-off time that, compared to the first switch-off time, is brought forward or pushed back relative to the predefined interval from the primary-side switch-off process (S4, S5), carrying out a second detection of a second voltage on the storage element of the snubber circuit after the controllable switching element is switched off for the second time, ascertaining a difference between the first voltage and the second voltage, and ascertaining the subsequent optimized switch-off time on the basis of the ascertained positive or negative difference, as the switch-off time that is brought forward or pushed back relative to the last switch-off time ascertained.

The considerations and advantages that apply to the circuit apparatus are also applicable to the method for actuating a synchronous rectifier. In particular, this method can actuate circuit apparatuses that have the same structural features as the different embodiments of the circuit apparatuses according to the invention that have been outlined above.

Furthermore, a computer program product is specified that comprises commands that, during execution of the program by a computer, cause the latter to carry out the method explained above.

Moreover, a computer-readable storage medium is specified that comprises commands that, during execution by a computer, cause the latter to carry out the method described above.

A drive system is specified that has a first DC source at a first voltage and a second DC source at a second voltage, wherein the first voltage is higher than the second voltage. Furthermore, the drive system has a drive unit and an inverter that electrically couples the first DC source to the drive unit. This drive system contains a DC-DC voltage converter with a circuit apparatus, according to the descriptions above, the primary side of which DC-DC voltage converter is electrically connected to the first DC source and the secondary side of which DC-DC voltage converter is connected to the second DC source. The DC-DC voltage converter can therefore supply the second DC source with electrical energy from the first DC source.

BRIEF DESCRIPTION OF THE DRAWINGS

One exemplary embodiment of the invention and the effect thereof are depicted in FIGS. 1 and 2 and are explained in more detail below. In the figures.

DETAILED DESCRIPTION

Figure 1A:
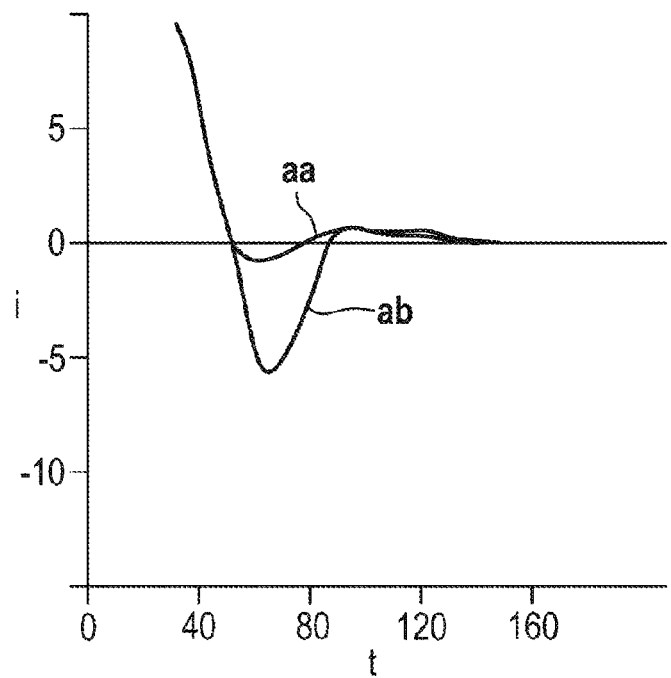
FIGS. 1a and 1b show the influence of the disconnection time on the reverse recovery current forming upon disconnection in a MOSFET transistor.
Figure 1B:
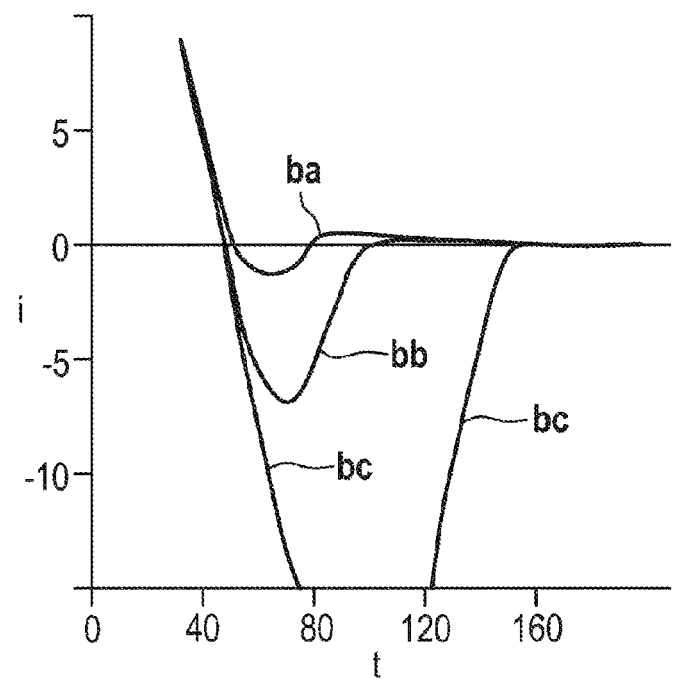

In this exemplary embodiment, a MOSFET transistor that represents the above-described multiplicity of possible switching elements is used for the controllable switching element. FIGS. 1a and 1b show the influence of the disconnection time on the reverse recovery current forming upon disconnection, using the example of a controlled MOSFET transistor with an inductive load. In FIG. 1a, the two measurement curves show the characteristic of the current i in amps on a MOSFET transistor, plotted against time tin nanoseconds, wherein the MOSFET transistor has been disconnected too soon. In this case, the MOSFET transistor has been disconnected 10 ns too soon in the case of the measurement curve aa and the current has been disconnected 200 ns too soon on the measurement curve ab. It can clearly be seen that the reverse recovery current and the resulting electrical charge increase the further away the disconnection time is from the optimum time.

FIG. 1b shows the characteristic of the reverse recovery current in the case of a measurement according to FIG. 1a, but with delayed disconnection. The measurement curve ba represents disconnection that is 10 ns too late, the measurement curve bb represents disconnection that is 20 ns too late and the measurement curve be represents disconnection that is 50 ns too late. In the case of this so-called "shoot through", the channel of the MOSFET transistor of a synchronous rectifier is closed too late. On account of the high rate of current rise in this phase, very high reverse currents and charges also occur here. Considerable disconnection losses arise in the controlled MOSFET transistor as a result of less than optimum selection of the switch-off time. These are especially significant in particular in the case of high switching frequencies of a DC-DC voltage converter.

Figure 2:
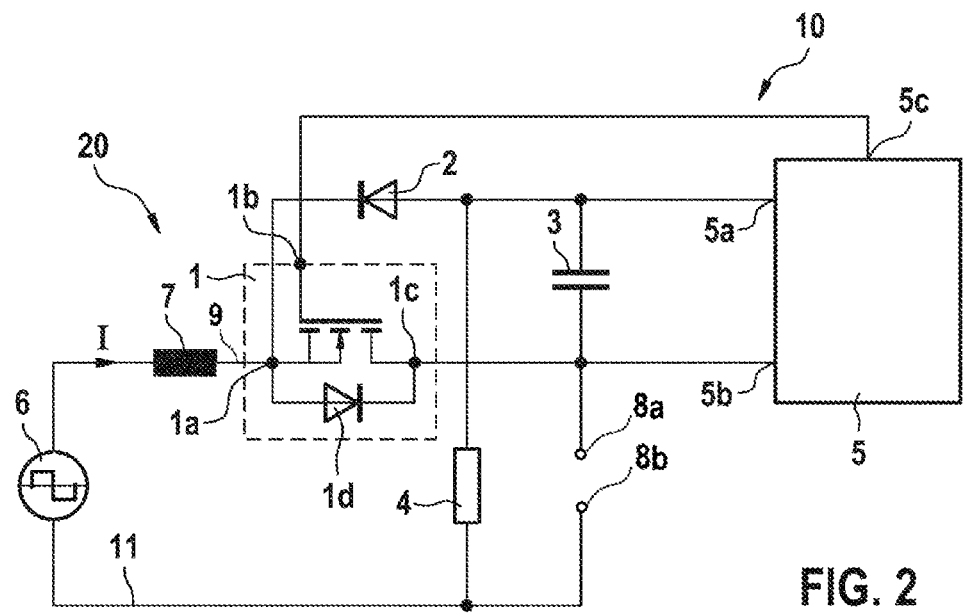
FIG. 2 shows the circuit apparatus together with the secondary circuit of a DC-DC voltage converter.

FIG. 2 shows a simplified equivalent circuit diagram of a secondary side 20 of a DC-DC voltage converter with a circuit apparatus 10 according to the invention. The topology of the DC-DC voltage converter 20 can have a flyback, forward converter or resonant converter topology, or a topology derived therefrom, for example. The secondary side 20 of the DC-DC voltage converter is fed by the secondary winding 6 of a transformer, which is assumed to be ideal, as the AC voltage source, which is supplied with electricity by a primary side (not depicted in FIG. 2) of the DC-DC voltage converter. In the equivalent circuit diagram, a leakage inductance 7 represents the inductance of the secondary side of the transformer that is not depicted and the parasitic leakage inductance of the secondary side of the DC-DC voltage converter. This leakage inductance 7, which is connected to a first contact of the AC voltage source in the equivalent circuit diagram, forms the positive potential connection 9 of the secondary-side winding 6 of the transformer on the side that is averted from the secondary-side winding 6 of the transformer.

Furthermore, a first contact 1a, in particular a source contact, of a MOSFET transistor 1 of the circuit apparatus 10 for controlling the current is connected to this positive potential connection 9, said first contact being used to rectify the current I on the secondary side 20 of the DC-DC voltage converter. A second contact 1c, in particular a drain contact, of the MOSFET transistor 1 is connected to a first connection 8a of the output of the secondary side 20 of the DC-DC voltage converter.

FIG. 2 depicts the intrinsic diode 1d of the MOSFET transistor 1 in parallel with the source contact 1a and the drain contact 1c. A negative potential connection 11 of the secondary winding of the transformer, which is represented in the equivalent circuit diagram here by a lower contact of the AC voltage source 6, is connected to a second connection 8b of the output of the secondary side 20 of the DC-DC voltage converter. The current I rectified by the rectifier circuit feeds the output 8a, 8b of the secondary side 20 of the DC-DC voltage converter.

A snubber circuit is used to limit the overvoltage on the MOSFET transistor 1 of the rectifier circuit that arises during the disconnection process. In this case, the snubber circuit has a series circuit that comprises a diode 2 and a storage capacitor 3 and that is electrically connected in parallel with the MOSFET transistor 1 at the source contact 1a and the drain contact 1c of the MOSFET transistor. The snubber circuit additionally has a discharge resistor 4 that is connected between a common contact of the diode 2 and the capacitor 3 and the negative potential connection 11.

The snubber circuit described is a specific arrangement of what is known as an RCD snubber (resistor, capacitor, diode). Other arrangements of these elements are also known in principle from the literature and can be used for the method described.

In the circuit apparatus 10, the initially positive current I is reduced by the negative square-wave edge of the AC voltage source 6. Finally, the arithmetic sign of the current I changes and said current flows in the forward direction through the MOSFET transistor 1 until the intrinsic diode can accept reverse voltage. The voltage across the intrinsic diode continues to rise and finally reaches the total voltage of the voltage on the output connections of the secondary side 8a, 8b of the DC-DC voltage converter and the negative edge of the AC voltage source of the secondary side 6 of the transformer.

There is no voltage across the leakage inductance 7 at this time, and so there is no further change to the current. The maximum forward current I is also reached at this time. The voltage across the MOSFET transistor 1 continues to rise as a result. As soon as the reverse voltage exceeds the voltage on the capacitor 3, the voltage across the diode 2 is forward biased and the current commutates from the MOSFET transistor 1 to the snubber circuit. As a result, the maximum voltage arising across the MOSFET transistor 1 is limited. Energy is stored in the storage capacitor 3 through this process. Some of the energy is converted into heat by way of the resistor 4, and some of it is output to the output 8a, 8b of the secondary side 10 of the DC-DC voltage converter. The energy transferred to the storage capacitor 3 per switching process depends directly on the energy stored at the switch-off time. The more power is delivered to the storage capacitor 3, the higher the voltage on this storage capacitor 3 rises. In the steady state, a voltage at which the power budget is equalized is obtained on the storage capacitor 3. Therefore, a control variable for optimizing the disconnection time of the MOSFET transistor 1 can be determined by way of a measurement of the slowly changing voltage on the storage capacitor 3.

An automatic control circuit 5 is connected to a first input 5a and a second input 5b in parallel with the capacitor 3 in order to tap the voltage. The gate contact 1b of the MOSFET transistor 1 is connected to the output 5c of the automatic control circuit 5. The automatic control circuit 5 can switch off the MOSFET transistor 1 via this contact 5c. An actuating circuit for switching on the MOSFET transistor 1 is not shown for the sake of clarity.

The automatic control circuit 5 is configured in such a way that, in one cycle, there is a small variation of the disconnection time of the MOSFET transistor 1 compared to the preceding disconnection time, in particular relative to a predefined interval from a primary-side switch-off process, wherein a detected voltage on the capacitor 3 of the snubber circuit is taken as a basis for ascertaining an optimized disconnection time in order to minimize the voltage in a subsequent cycle. Optimum operation of the synchronous rectifier circuit is established as a result.

Figure 3:
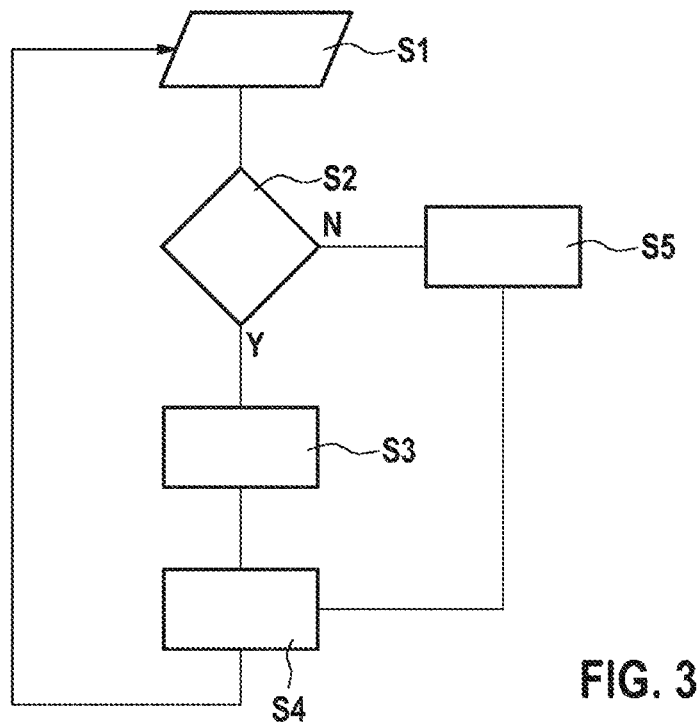
FIG. 3 shows a flow diagram for a method for actuating a secondary side of a DC-DC voltage converter.

By way of example, FIG. 3 shows a flowchart for the method for actuating a secondary side of a DC-DC voltage converter.

In step S1, a voltage measurement is carried out at the storage element 3 of the snubber circuit and a voltage V(k) is detected on the storage capacitor 3 and, in step S2, compared with the voltage V(k−1) measured in the preceding cycle.

If the value V(k)<V(k−1), then in step S3 the variation of the switch-off time dT(k), that is to say the bringing forward or pushing back of the switch-off time, is accordingly set in the same direction as the preceding variation of the switch-off time dT(k−1):

$dT(k)=dT(k-1).$

If the value V(k)>=V(k−1), then in step S5 the variation of the switch-off time dT(k) is set counter to the with the negative value of the preceding variation of the switch-off time dT(k−1):

$dT(k)=-dT(k-1).$

In step S4, for both cases, the new optimized switch-off time A(k) then results from the old switch-off time A(k−1) plus dT(k):

$A(k)=A(k-1)+dT(k).$

This is followed by a new pass that starts again at S1.

The invention claimed is:

1. A circuit apparatus (10) for controlling the flow of current on a secondary side (20) of a DC-DC voltage converter, the circuit apparatus (10) comprising:
a controllable switching element (1), for switching the flow of current through the secondary side of the DC-DC voltage converter, with a first connection (1a), a second connection (1c) and a control connection (1b);
a snubber circuit that is electrically coupled to the first connection (1a) and the second connection (1c); and
an automatic control circuit (5) configured to
switch off the controllable switching element (1) cyclically by means of the control connection (1b) at a time, wherein the time is at a pre-definable interval from a primary-side switch-off process,
ascertain a switch-off time for a subsequent cycle of the controllable switching element (1), and
accordingly switch off the controllable switching element (1) at the subsequent switch-off time in the subsequent cycle by means of the control connection (1b), wherein the automatic control circuit (5) is electrically coupled to the snubber circuit and is configured to ascertain the optimized switch-off time based on an electrical variable of the snubber circuit.

2. The circuit apparatus (10) as claimed in claim 1, wherein the automatic control circuit (5) uses a voltage tap on a storage element of the snubber circuit to detect a voltage on the storage element.

3. The circuit apparatus (10) as claimed in claim 1, wherein the automatic control circuit (5) is configured
to carry out a first detection of a first voltage on the storage element of the snubber circuit after the controllable switching element (1) is switched off for the first time,
to select, for subsequently switching off said controllable switching element for the second time, a switch-off time that, compared to the first switch-off time, is brought forward or pushed back relative to the predefined interval from the primary-side switch-off process,
to carry out a second detection of a second voltage on the storage element of the snubber circuit after the controllable switching element (1) is switched off for the second time at the selected subsequent switch-off time, and
to ascertain a difference between the first voltage and the second voltage, and to ascertain the switch-off time optimized for the subsequent cycle based on the ascertained positive or negative difference, as the subsequent switch-off time that is brought forward or pushed back relative to the last switch-off time ascertained.

4. The circuit apparatus (10) as claimed in claim 1, wherein the automatic control circuit (5) has a microcontroller circuit.

5. The circuit apparatus (10) as claimed in claim 1, wherein the first connection (1a) of the controllable switching element (1) is connected to a positive potential connection (9) of a secondary-side winding (6) of a transformer of the DC-DC voltage converter,
and the snubber circuit is electrically connected to the first connection (1a) of the controllable switching element (1), the second connection (1c) of the controllable switching element (1) and a negative potential connection (11) of the secondary-side winding (6) of the transformer.

6. The circuit apparatus (10) as claimed in claim 1, wherein the snubber circuit has a capacitor (3) as the storage element.

7. The circuit apparatus (10) as claimed in claim 6, wherein the snubber circuit has a series circuit that comprises a diode (2) and a capacitor (3) as the storage element and that is connected in parallel with the first connection (1a) and the second connection (1c) of the controllable switching element (1), and also a discharge resistor (4) that is connected to a center tap, between the diode (2) and the capacitor (3), and to a negative potential connection (11) of the secondary-side winding (6) of the transformer.

8. A method for actuating a secondary side of a DC-DC voltage converter (20), wherein the secondary side has a controllable switching element (1) with a first connection (1a), a second connection (1c) and a control connection (1b) and
   a snubber circuit (2, 3, 4) that is electrically coupled to the first connection (1a) and the second connection (1c),
   wherein the method switches off the controllable switching element (1) cyclically at a time, wherein the time is at a pre-definable interval from a primary-side switch-off process,
   and ascertains a subsequent switch-off time for a subsequent switching cycle for actuating the controllable switching element (1) based on a voltage on a storage element of the snubber circuit.

9. The method as claimed in claim 8, wherein the method ascertains an optimized switch-off time for actuating the controllable switching element (1) by
   carrying out a first detection of a first voltage on the storage element of the snubber circuit after the controllable switching element (1) is switched off for the first time (S1),
   selecting, for subsequently switching off said controllable switching element for the second time, a switch-off time that, compared to the first switch-off time, is brought forward or pushed back relative to the pre-defined interval from the primary-side switch-off process,
   carrying out a second detection of a second voltage on the storage element of the snubber circuit after the controllable switching element (1) is switched off for the second time (S1), ascertaining a difference between the first voltage and the second voltage (S2),
   and ascertaining the subsequent switch-off time based on the ascertained positive or negative difference, as the switch-off time that is brought forward or pushed back relative to the last switch-off time ascertained (S3, S5, S4).

10. A non-transitory computer-readable storage medium comprising instructions that when executed by a computer cause the computer to
    control a circuit that includes a secondary side of a DC-DC voltage converter (20), wherein the secondary side has a controllable switching element (1) with a first connection (1a), a second connection (1c) and a control connection (1b) and a snubber circuit (2, 3, 4) that is electrically coupled to the first connection (1a) and the second connection (1c),
    switch off the controllable switching element (1) cyclically at a time, wherein the time is at a pre-definable interval from a primary-side switch-off process,
    ascertain a subsequent switch-off time for a subsequent switching cycle for actuating the controllable switching element (1) based on a voltage on a storage element of the snubber circuit, and
    accordingly switch off the controllable switching element (1) at the subsequent switch-off time in the subsequent cycle by means of the control connection (1b), wherein the automatic control circuit (5) is electrically coupled to the snubber circuit and is configured to ascertain the optimized switch-off time based on an electrical variable of the snubber circuit.

* * * * *